United States Patent Office 2,911,396
Patented Nov. 3, 1959

2,911,396

COPOLYMERS OF FLUORO-1,3-DIENES AND ISOBUTENE

Archibald N. Bolstad, Maplewood, and Francis J. Honn, Westfield, N.J., assignors, by mesne assignments, to Minnesota Mining and Manufacturing Company, St. Paul, Minn., a corporation of Delaware No Drawing. Application April 1, 1955
Serial No. 498,756

11 Claims. (Cl. 260—87.5)

This invention relates to halogen-containing copolymers. In one aspect, the invention relates to fluorine-containing copolymers. More particularly, in this aspect, the invention relates to fluorine-containing elastomeric copolymers and a method for their manufacture.

Fluorine-containing copolymers have been found to possess many useful applications by virtue of their relative chemical inertness and high physical strength and resistance. Because of these properties, such fluorine-containing copolymers can be fabricated into a variety of useful articles having improved chemical and physical stability. In this respect, however, it is also desirable that these fluorine-containing copolymers, in addition to the aforementioned characteristics, also possess elastomeric properties so that a high degree of flexibility, elasticity, and extensibility is obtained, and which can be easily vulcanized and processed.

It is therefore an object of this invention to provide new and useful fluorine-containing polymers having desirable chemical and physical characteristics.

Another object of the invention is to provide new and useful fluorine-containing elastomeric copolymers, having the aforementioned characteristics, which can be easily fabricated into a wide variety of useful articles of improved chemical and physical stability.

Still another object of the invention is to provide a method for the preparation of the aforementioned elastomeric fluorine-containing copolymers.

Various other objects and advantages inherent in the present invention will become apparent to those skilled in the art from the accompanying description and disclosure.

The copolymers of the present invention are elastomeric copolymers of a fluoro-1,3-diene and isobutene. In general, as more fully hereinafter disclosed, these copolymers are prepared by copolymerizing the fluoro-1,3-diene and isobutene in the presence of a polymerization catalyst at temperatures between about 0° C. and about 75° C. The copolymers thus obtained are valuable macromolecules, which are adaptable to a number of commercial uses, possessing varying degrees of flexibility, elasticity and resiliency, and which can be easily vulcanized and processed. These copolymers are chemically and thermally stable, resistant to oil and hydrocarbon-fuels, selectively soluble in various organic solvents, and can be molded by conventional techniques to yield a wide variety of useful articles and are also suitable and useful as durable, flexible, protective coatings on surfaces which are to be subjected to environmental conditions in which they may come into contact with corrosive substances, for example, oils, fuels, and strong chemical reagents. In this respect, the aforementioned corrosive-resistance, good chemical and physical stability of the fluoro-1,3-diene monomer, is complemented by the rubbery characteristics of the isobutene monomer, which tends to break-up the crystallinity of the fluoro-1,3-diene homopolymer, so that an elastomeric copolymer is produced, possessing each of the aforementioned desirable chemical and physical characteristics.

As indicated above, the isobutene monomer is copolymerized with a fluoro-1,3-diene monomer. Examples of these fluoro-1,3-dienes that can be copolymerized with the isobutene monomer are perfluorobutadiene; 1,1-difluorobutadiene; 1,1-difluoro-3-methylbutadiene; 1,1-difluoro-2-methylbutadiene; 1,1-3-trifluorobutadiene; and 1,1-2-trifluorobutadiene.

The most useful elastomeric copolymer produced in accordance with this invention, contains between about 1 and about 50 mole percent isobutene, and the remaining major constituent being the fluoro-1,3-diene, which is present in an amount between about 50 mole percent and about 99 mole percent. Copolymers containing between about 5 mole percent and about 30 mole percent of isobutene are preferred.

It is found that the isobutene monomer polymerizes at a considerably slower rate than do the fluoro-1,3-diene comonomers of the present invention. No feed consisting of isobutene and a pure fluoro-1,3-diene, such as those indicated above, will yield a copolymer of the same composition as the feed. In order to obtain a copolymer containing between about 1 and about 50 mole percent of isobutene based on the total weight of the monomers present in the copolymer, it is necessary to use an initial charge in which the isobutene monomer is present in an amount between about 5 mole percent and about 75 mole percent based on the total weight of monomers present in the comonomer feed. For the preferred copolymers, containing between about 5 and about 30 mole percent isobutene based on the total weight of monomers present in the copolymer, it is necessary to use an initial charge of monomers in which the isobutene monomer is present in an amount between about 10 and about 50 mole percent of the total monomers present in the feed.

The elastomeric copolymers of this invention are prepared by employing one of a number of free-radical promoted polymerization systems, the polymerization being conducted within the aforementioned temperature range between about 0° C. and about 75° C. The preferred temperature is determined by the catalyst and/or the type of polymerization system employed. The polymerization promoters found to be suitable in initiating the polymerization reactions described herein, are of the peroxy type, as more fully hereinafter discussed, and are employed either in an emulsion or water-suspension type system. The emulsion type system is preferred.

One of the water-suspension type catalyst systems which may be used in carrying out the aforementioned copolymerization reaction is a redox catalyst system comprising an oxidant and a reductant. The oxidant in this water-suspension type recipe is preferably an inorganic persulfate, such as potassium persulfate, sodium persulfate, or ammonium persulfate. The reductant is preferably a bisulfite, such as potassium bisulfite, sodium bisulfite, potassium metabisulfite, or sodium metabisulfite. The oxidant in the suspension redox recipe comprises between about 0.1 and about 5 parts by weight, per 100 parts of total monomers present. The reductant, for example, sodium metabisulfite, comprises between about 0.05 and about 5 parts by weight, per 100 parts of total monomers present, and preferably comprises between about 0.1 and about 2 parts by weight, per 100 parts of total monomers present. It has been found that the presence of sodium tetraborate along with the oxidant and reductant improves the ease with which copolymerization takes place in this suspension-type polymerization system. It is also within the scope of this invention to conduct the copolymerization reaction, employing the aforementioned suspension-type recipe to which between about 0.01 and about 1.0 part by weight, per 100 parts of total monomers present, of a variable valence metal salt has been added. The variable valence metal salt is preferably an iron salt, such as ferrous sulfate or ferrous nitrate, and its purpose is to regenerate the oxidant. When producing the copolymers of the present invention, employing a persulfate-bisulfite system, it is preferably to employ temperatures between about 25° C. and about 60° C. However, lower temperatures, for example, between about 5° C. and about 25° C. are preferably employed when a variable valence metal salt is present in the system. It should be noted that it is also within the scope of this invention to carry out the copolymerization reaction with the water-suspension type recipe in which the catalyst system contains only the oxidant, thus eliminating the presence of the reductant as well as the variable valence metal salt, if so desired.

As indicated above, an emulsion type catalyst system is preferred to a water-suspension type catalyst system in conducting the copolymerization reaction, in order to obtain higher percent conversions of the monomers to produce the desired copolymers of the present invention. The emulsion recipes used in accordance with this invention, are those which comprise water, a soap, and a peroxy compound. The different types of emulsion systems are conveniently differentiated on the basis of the catalyst system used to initiate the copolymerization reaction. One type is that in which the copolymerization is initiated by employing a redox catalyst system comprising between about 0.01 and about 1.0 part by weight, per 100 parts of total monomers present, of an organic oxidant and an activator solution. Typical examples of the organic oxidants which are used in this emulsion-catalyst system are cumene hydroperoxide, diisopropylbenzene hydroperoxide, t-butyl isopropylbenzene hydroperoxide, triisopropylbenzene hydroperoxide, methylcyclohexane hydroperoxide, t-butyl perbenzoate and tertiary-butyl hydroperoxide. A typical activator solution which is employed is one comprising between about 0.01 and about 1.0 part by weight, per 100 parts of total monomers present, of a variable valence metal salt, for example, ferrous sulfate; between about 0.1 and about 10 parts by weight of sodium pyrophosphate; and between about 0.1 and about 10 parts by weight of a reducing sugar, such as dextrose, fructose, or levulose. The presence of the sodium pyrophosphate and the reducing sugar stabilizes the concentration of the lower valence state of the metal or variable valence metal salt.

A second type of emulsion catalyst system is one which comprises between about 0.05 and about 5.0 parts by weight, per 100 parts of total monomers present, of a persulfate as the oxidant; and preferably comprises between about 0.1 and about 0.5 part by weight of any of the persulfates mentioned above, as suitable for the polymerization in aqueous suspension systems.

The soap employed as the emulsifier in either the redox or persulfate emulsion catalyst systems is preferably a metal salt, such as the potassium or sodium salts derived from saturated aliphatic acids, the optimum chain-length of the acid being between about 14 and about 20 carbon atoms. Such a soap is used in an amount between about 0.5 and about 10 parts by weight, per 100 parts of total monomers present. In a preferred modification, perfluorochlorocarbon carboxylic acid soaps, e.g., trifluorochloroethylene telomer acid soaps, are employed. The emulsion polymerization is preferably conducted under alkaline conditions. It is desirable in these emulsion systems that the pH be maintained within the limitations of between about 9 and 11, in order to prevent gelling of the soap, a condition which oftentimes results in slow-down or stoppage of the polymerization reaction. It is sometimes necessary to maintain the pH of the system between the aforementioned pH limits by the addition of suitable buffer solutions. Typical examples of these buffers are solutions comprising 21.3 ml. 0.1 N—NaOH and 50 ml. 0.1 N—H$_3$BO$_3$ diluted to 100 ml.; or 43.9 ml. 0.1 N—NaOH and 50 ml. 0.1 N—H$_3$BO$_3$ diluted to 100 ml.

The temperature employed when conducting the copolymerization reaction of the present invention, in an emulsion type recipe system is preferably between about 5° C. and about 60° C. The lower temperatures, for example, between about 5° C. and about 35° C. are employed for the redox emulsion system and the higher temperatures, for example, between about 35° C. and about 60° C. are preferred when employing the persulfate catalyst emulsion system. The polymerization reaction is carried out under autogenous conditions of pressure.

As previously indicated, the elastomeric copolymers of the present invention are particularly suited and useful for the fabrication of a wide variety of rubber-like materials, having highly desirable chemical and physical properties, such as in the manufacture of protective articles of clothing, e.g., boots, suits, gloves, belts, and in the fabrication of resilient gaskets, seals, pump and valve-diaphragms, films, and other commercial applications.

Another important use of the copolymers of the present invention is in the form of durable, flexible coatings for application to metal or fabric surfaces in which lack of rigidity or drape is not a prime requisite. These polymers may therefore be dissolved in various commercial solvents. Particularly useful solvents comprise the aliphatic and aromatic esters, the ether alcohols, ketones, and halogenated hydrocarbons. Typical examples of these solvents are diisobutyl ketone, methyl ethyl ketone, methyl isobutyl ketone, ethoxy ethanol; ethyl benzoate, carbon tetrachloride, and 1,1,3-trichlorotrifluoroethane. In this respect, it is often desirable to reduce the molecular weight of the copolymers of this invention in order to obtain greater solubility in organic solvents, such as those indicated above. This is of importance in order to vary the softness of the copolymer for easier processibility in subsequent molding operations. Reduction of the strength of the recipe of the polymerization catalyst merely slows the rate of the reaction without affecting appreciably the molecular weight of the finished copolymer. It has been found, however, that the addition of various polymerization modifiers appreciably reduces the molecular weight of the copolymeric products, and increases their solubility and ease of processibility without affecting unduly, the overall yield. Suitable polymerization modifiers include chloroform (CHCl$_3$), Freon–113 (CF$_2$ClCFCl$_2$), carbon tetrachloride (CCl$_4$), trichloroacetyl chloride (CCl$_3$COCl), bromotrichloromethane (CBrCl$_3$), and dodecyl mercaptan (C$_{12}$H$_{25}$SH). These modifiers are preferably added in amounts between about 0.01 to about 10 parts by weight, per 100 parts of total monomers charged to the polymerization reaction. Of these modifiers, dodecyl mercaptan is preferred.

The following examples are offered for a better understanding of the present invention and are not to be construed as limiting its scope.

*Example I*

This example is intended to illustrate the copolymerization of 1,1-difluoro-3-methylbutadiene and isobutene to produce an elastomeric copolymer.

The charge added to a polymerization tube, represents 5 percent by weight of the following recipe:

| | Parts by weight |
|---|---|
| Water, deionized | 200 |
| 1,1-difluoro-3-methylbutadiene | 65 |
| Isobutene | 35 |
| KORR Soap | 5.0 |
| Potassium persulfate | 0.3 |
| Dodecyl mercaptan | 0.3 |

A 20 ml. glass polymerization tube is charged with the following ingredients:

(1) 9 ml. of a soap solution prepared by dissolving 0.25 gram potasium fatty acid soap (KORR Soap) in 9 ml.

of deionized water by stirring and heating at a temperature of about 50° C. When solution is complete, the solution is cooled to room temperature (22° C.) and the pH is adjusted to 10.2; 0.015 gram of tertiary-dodecyl mercaptan is added and the resulting mixture is stirred and frozen solid in a freezing bath consisting of a slush of Dry Ice and trichloroethylene;

(2) 1.0 ml. of a 1.5% solution of potassium persulfate and (3) 3.25 grams of 1,1-difluoro-3-methylbutadiene and 1.75 grams of isobutene representing a 50:50 molar charge of monomers.

The glass polymerization tube is sealed under vacuum at liquid nitrogen temperature and then placed in a water bath at 50° C. and the contents shaken for a period of 24 hours. At the end of this period the tube is frozen in liquid nitrogen to reduce the vapor pressure resulting from unreacted monomers, and at the same time, to coagulate the copolymer. The contents of the tube are then removed and washed with distilled water until free of soap. The washed contents are then dried to constant weight in vacuo at 35° C. An extensible rubbery copolymer is obtained, which upon fluorine analysis is found to comprise 15 mole percent of isobutene and the remaining major constituent is 1,1-difluoro-3-methylbutadiene. The copolymer is obtained in a yield representing a 48 percent conversion.

*Example II*

A 20 ml. glass polymerization tube is charged with the same catalyst solution as set forth in Example I above, and further charged with 3.08 grams of 1,1-difluorobutadiene and 1.92 grams of isobutene, representing a 50:50 molar charge of monomers. The polymerization reaction is carried out as set forth in Example I. As a result of this procedure, an elastomeric rubbery copolymer is obtained which is found upon fluorine analysis to comprise 1 mole percent of isobutene and the remaining major constituent is 1,1-difluorobutadiene. The copolymer is obtained in a yield representing a 30 percent conversion.

*Example III*

This example is intended to illustrate the copolymerization of perfluorobutadiene and isobutene to produce an elastomeric copolymer.

The charge added to a polymerization tube represents 5 percent by weight of the following recipe:

| | Parts by weight |
|---|---|
| Water, deionized | 200 |
| Perfluorobutadiene | 74 |
| Isobutene | 26 |
| Korr Soap | 5.0 |
| Cumene hydroperoxide 100% | 0.15 |
| Sodium pyrophosphate | 1.0 |
| Ferrous sulfate heptahydrate | 0.1 |
| Dextrose | 1.0 |
| Dodecyl mercaptan | 0.3 |

A 20 ml. glass polymerization tube is charged with the following ingredients:

(1) 7.0 ml. of a soap solution prepared by dissolving 0.25 gram of potassium fatty acid soap (KORR Soap) in 7 ml. of deionized water, solution being accomplished by stirring and heating at a temperature of about 50° C. After cooling this solution to 30° C., the pH is adjusted to 10.0 and .015 gram of tertiary-dodecyl mercaptan and 0.01 gram of a 75% cumene hydroperoxide are added with stirring. The polymerization tube is then placed in a freezing bath of liquid nitrogen;

(2) 5.0 ml. of activator solution prepared by dissolving 0.05 gram of sodium pyrophosphate decahydrate ($Na_4P_2O_7 \cdot 10H_2O$) and 0.05 gram of anhydrous dextrose in 2.5 ml. of deionized water, solution being accomplished by heating at 90° C. under a stream of nitrogen. After holding the resulting solution at 90° C. for 10 minutes, it is cooled to 60° C. and 0.005 gram of ferrous sulfate heptahydrate ($FeSO_4 \cdot 7H_2O$) and 0.5 ml. of deionized water are added, followed by cooling of the resulting mixture to 30° C. before using;

(3) 3.72 grams of 1,1-difluorobutadiene and;

(4) 1.28 grams of isobutene.

The glass polymerization tube is sealed under vacuum at liquid nitrogen temperature. This tube is warmed to 20° C. and the contents therein are shaken for a period of 24 hours. At the end of this period, the tube is frozen in liquid nitrogen to reduce the vapor pressure resulting from unreacted monomers, and at the same time to coagulate the copolymer. The contents of the tube are then removed and washed with distilled water until free of soap. The washed contents are then dried to constant weight in vacuo at 35° C. As a result of this procedure, a rubbery elastomeric product is obtained, which upon fluorine analysis is found to comprise 1 mole percent of isobutene and the remaining major constituent being 1,1-difluorobutadiene. The copolymer is obtained in a yield representing a 30 percent conversion.

*Example IV*

A 20 ml. glass polymerization tube is charged with the same catalyst solution as set forth in Example III above, and further charged with 3.25 grams of 1,1-difluoro-2-methylbutadiene and 1.75 grams of isobutene, representing a 50:50 molar charge of monomers. The polymerization reaction is carried out as set forth in Example III. As a result of this procedure, an elastomeric rubbery copolymer is obtained which is found upon fluorine analysis to comprise 2 mole percent of isobutene, the remaining major constituent being 1,1-difluoro-2-methylbutadiene. The copolymer is obtained in a yield representing a 25 percent conversion.

*Example V*

A 20 ml. glass polymerization tube is charged with the same catalyst solution as set forth in Example III above, and further charged with 3.2 grams of 1,1-3-trifluorobutadiene and 1.8 grams of isobutene, representing a 50:50 molar charge of monomers. The polymerization reaction is carried out as set forth in Example III. As a result of this procedure, an elastomeric rubbery copolymer is obtained which is found upon fluorine analysis to comprise 5 mole percent of isobutene, the remaining major constituent being 1,1-3-trifluorobutadiene. The copolymer is obtained in a yield representing a 40 percent conversion.

*Example VI*

A 20 ml. glass polymerization tube is charged with the same catalyst solution as set forth in Example III above, and further charged with 3.2 grams of 1,1-2-trifluorobutadiene and 1.8 grams of isobutene, representing a 50:50 molar charge of monomers. The polymerization reaction is carried out as set forth in Example III. As a result of this procedure, an elastomeric rubbery copolymer is obtained which is found upon fluorine analysis to comprise 2 mole percent of isobutene, the remaining major constituent being 1,1-2-trifluorobutadiene. The copolymer is obtained in a yield representing a 30 percent conversion.

As previously indicated, the elastomeric copolymers of the present invention, possess highly desirable chemical and physical properties which make them useful for the fabrication of a wide variety of rubber-like articles, or for application to various surfaces as protective coatings. For such uses the raw elastomeric copolymer, can be pressed into sheets at temperatures between about 300° F. and about 500° F., from which various articles, such as gaskets, diaphragms, etc. may be fabricated. In this respect, it should be noted that the raw copolymer may also include various vulcanizing agents, and fillers, if so desired.

When employed as protective coatings, for any of the surfaces previously described, the raw elastomeric copolymer is dissolved in any of the aforementioned solvents, and is applied to the desired surface, employing such apparatus as a knife-spreader or a doctor-blade or a reverse-roll coater. The solvent, after the elastomeric coating composition has been applied to the surface, is permitted to evaporate. This may also be accomplished in the presence of elevated temperature. After the solvent has completely evaporated, the coated surface is now ready for use. In this respect, it should also be noted that the copolymeric coating composition may be applied to the surface either as a single coat, or if so desired, the protective coating may be built up by the application of several layers, each layer being permitted to harden by solvent evaporation before the next layer is applied. Furthermore, if so desired, the protective coatings, or elastomeric copolymer which is obtained in the form of sheets, may be suitably pigmented.

Since certain changes may be made in carrying out the process of the present invention in producing the desired elastomeric copolymers without departing from the scope of the invention, it is intended that all matter contained in the above description is to be interpreted as illustrative and not necessarily in a limiting sense.

We claim:
1. A method for preparing a copolymer which comprises polymerizing a mixture of a fluoro-1,3-butadiene containing a terminal carbon atom bearing 2 fluorine atoms and isobutene as substantially the sole monomeric components at a temperature between about 0° C. and about 75° C. in the presence of a polymerization promoter, said mixture containing between about 5 mole percent and about 75 mole percent of isobutene based on the weight of the fluoro-1,3-butadiene and isobutene.

2. A method for preparing a copolymer which comprises polymerizing a mixture of a fluoro-1,3-butadiene containing a terminal carbon atom bearing 2 fluorine atoms and isobutene as substantially the sole monomeric components at a temperature between about 0° C. and about 75° C. in the presence of a polymerization promoter, said mixture containing between about 10 mole percent and about 50 mole percent of isobutene based on the weight of the fluoro-1,3-butadiene and isobutene.

3. A method for preparing a copolymer which comprises polymerizing a mixture of a fluoro-1,3-butadiene containing a terminal carbon atom bearing 2 fluorine atoms and isobutene as substantially the sole monomeric components in the presence of a polymerization promoter comprising an organic peroxy compound, said mixture containing between about 5 mole percent and about 75 mole percent of isobutene based on the weight of the fluoro-1,3-butadiene and the isobutene.

4. A copolymer of a fluoro-1,3-butadiene containing a terminal carbon atom bearing 2 fluorine atoms and isobutene as substantially the sole monomeric components.

5. A copolymer of perfluorobutadiene and isobutene as substantially the sole monomeric components.

6. A copolymer of 1,1-difluorobutadiene and isobutene as substantially the sole monomeric components.

7. A copolymer of 1,1-difluoro-3-methyl-butadiene and isobutene as substantially the sole monomeric components.

8. A copolymer of 1,1-3-trifluorobutadiene and isobutene as substantially the sole monomeric components.

9. A copolymer of 1,1-2-trifluorobutadiene and isobutene as substantially the sole monomeric components.

10. A copolymer consisting essentially of about 1–50 mole percent isobutene and about 99–50 mole percent of a polyfluoro-1,3-butadiene having at least two fluorine atoms on a terminal carbon atom in copolymerized form.

11. A copolymer consisting essentially of about 5–30 mole percent isobutene and about 95–70 mole percent of a polyfluoro-1,3-butadiene having at least two fluorine atoms on a terminal carbon atom in copolymerized form.

References Cited in the file of this patent

UNITED STATES PATENTS

| | | |
|---|---|---|
| 2,647,110 | Wiseman | July 28, 1953 |
| 2,750,431 | Tarrant et al. | June 12, 1956 |